United States Patent [19]

Schmitt et al.

[11] Patent Number: 4,475,840
[45] Date of Patent: Oct. 9, 1984

[54] METHOD AND APPARATUS FOR CONNECTING BOAT RAILINGS

[76] Inventors: Gervase A. Schmitt, 1109 Hempfield Dr.; Ronald T. Schmitt, 1015 Woodridge Blvd., both of Lancaster, Pa. 17601

[21] Appl. No.: 519,054

[22] Filed: Aug. 1, 1983

[51] Int. Cl.³ .................... B25G 3/00; F16D 1/00
[52] U.S. Cl. ........................... 403/20; 403/22; 403/237; 256/67
[58] Field of Search ............ 403/19, 22, 237, 234, 403/190, 189, 200, 192, 198, 246, 47, 296, 8, 4, 20; 256/67, 65

[56] References Cited

U.S. PATENT DOCUMENTS 3,193,228  7/1965  Chloy .
3,995,962  12/1976  Mylaeus .............................. 403/47
4,371,279  2/1983  Prussey ................................ 403/8

FOREIGN PATENT DOCUMENTS 73569  8/1960  France ................................ 403/296

Primary Examiner—Andrew V. Kundrat
Attorney, Agent, or Firm—Larry W. Miller

[57] ABSTRACT

A boat railing is disclosed wherein the stanchions are connected to the rail by a threaded member internally threaded into both the rail and each respective stanchion. An insert adapted for connection to the threaded member can be movably inserted within the rail to provide adjustable movement about the axis of the rail. A combination of the rotative movements of each stanchion on the threaded member and about the axis of the rail enables the bases of the stanchions to be properly fitted to the surface of the boat irrespective of the slope of the surface to which the base is to be attached.

16 Claims, 8 Drawing Figures

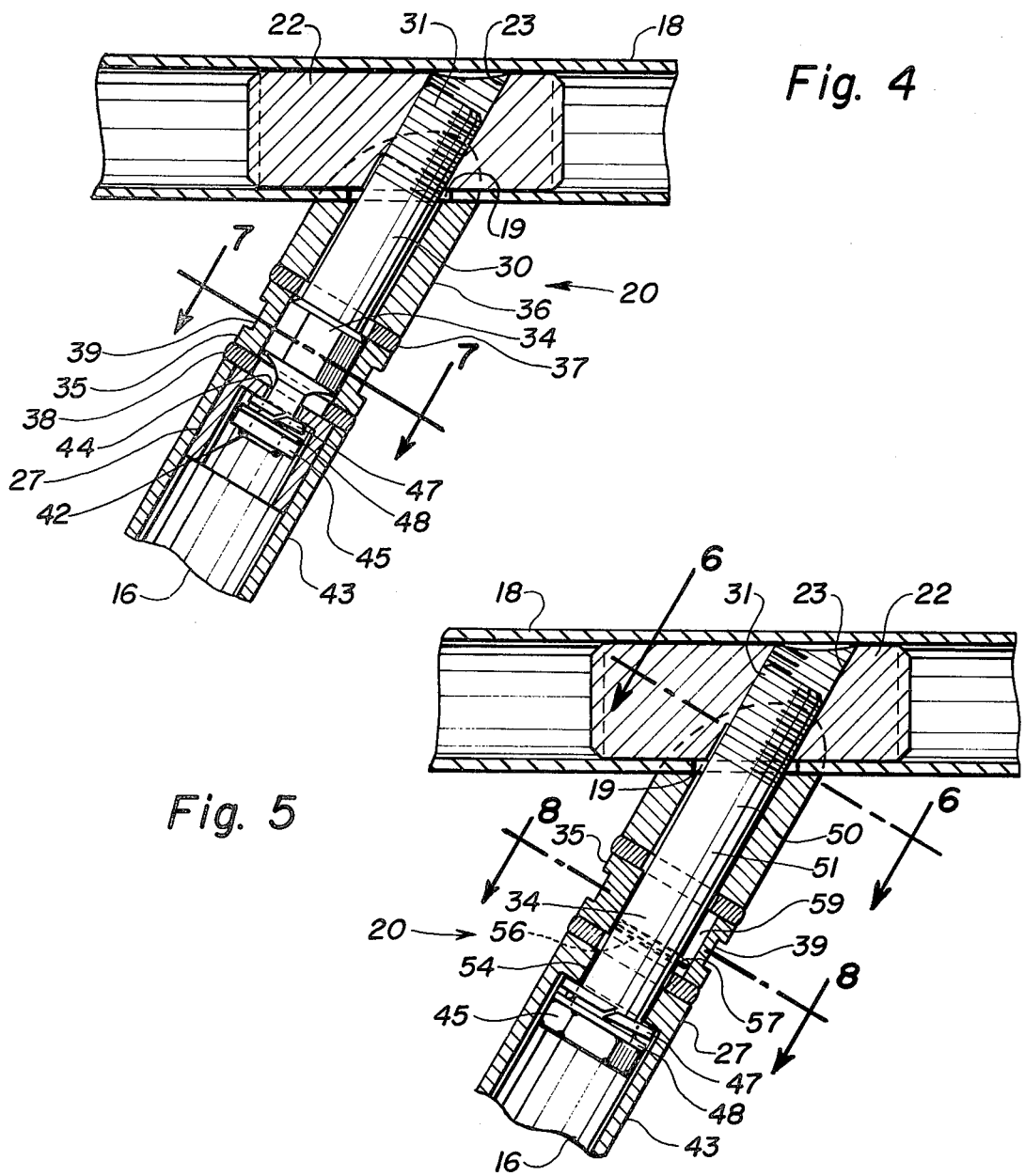

4,475,840

METHOD AND APPARATUS FOR CONNECTING BOAT RAILINGS

BACKGROUND OF THE INVENTION

The present invention relates generally to boat railings and, more particularly, to an improved connector internally threaded into each stanchion and into an insert within the generally horizontal rail for providing adjustable movement for the base of each stanchion before being connected to the surface of the boat.

Although alternative means for connecting boat railings and stanchions have been disclosed, such as seen in U.S. Pat. No. 3,055,024, granted on Sept. 25, 1962, to Gerbase G. Schmitt; and U.S. Pat. No. 3,193,228, granted on July 6, 1965; and U.S. Pat. No. 3,429,558, granted on Feb. 25, 1969, boat railings are typically generally unitary welded structures manufactured at a location remote from the manufacture of the boat and installed on the boat surface after manufacture is complete. Since the stanchions are typically disposed at an acute angle to the generally horizontal railing and are fixed relative thereto, such as by welding, the base of each stanchion must be positioned to match the corresponding surface of the boat before being fixed or welded to the rail. As a result, any variations in the manufacturing of the slope of the surface of the boat to which the base of the stanchion is to be attached results in an inexact fit between the base and the boat when the railing is installed.

Furthermore, an entire railing is generally fabricated for each particular boat on a custom basis, with the bases of the stanchions prefixed to match the particular boat to which it is to be installed. Accordingly, shipping and storage of such structures becomes a cumbersome and space consuming task. It would be desirable to provide a boat railing that would be capable of greater flexibility in use, require less storage space and create less problems in shipping from one location to another.

Asthetically, it is preferable that the boat railing have a clean, sleek look that can be provided by the welding process. This unitary look cannot be provided with railing connectors such as seen in the aforementioned U.S. Pat. No. 3,055,024. Accordingly, it would be desirable to provide a boat railing that would permit adjustment of the position of the base of the stanchions before being fixed to the boat surface, in addition to solving the above-noted problems, while having a clean, unitary look and being able to be securely and tightly fastened to the boat.

SUMMARY OF THE INVENTION

It is an object of this invention to overcome the aforementioned disadvantages of the prior art by providing an internally threaded boat railing connector for connecting each stanchion to the rail to permit adjustable movement of the base of the stanchion before being connected to the boat.

It is another object of the invention to provide an easily usable method of assembling a boat railing on a boat.

It is another object of this invention to provide two axes of adjustable movement for the base of a stanchion of a boat railing prior to connection thereof to a boat.

It is still another object of this invention to facilitate the manufacture of a boat railing and the installation thereof to the surface of a boat.

It is yet another object of this invention to reduce shipping problems of the boat railing from the manufacture thereof to the location of installation.

It is still another object of this invention to provide a means for connecting the stanchion to the rail to provide a solid boat railing without welding.

It is a further object of this invention to provide a means for locking the internal connector to prevent the stanchion from becoming loosened from the rail to which it is connected.

It is a feature of this invention that a boat railing has a unitary appearance without welding the stanchions to the generally horizontal rail.

It is an advantage of this invention that shipping and storage problems for boat railings are significantly reduced.

It is yet a further object of this invention to provide a boat railing that requires less storage space than a unitary welded boat railing.

It is still a further object of this invention to provide a boat railing with a greater flexibility in use.

It is still a further object of this invention to provide a non-welded boat railing which is durable in construction, inexpensive of manufacture, carefree of maintenance, facile in assemblage, asthetically pleasing in appearance, and simple and effective in use.

It is another advantage of this invention that the individual stanchions on a boat railing can be quickly and easily replaced without removing the entire railing from the boat.

It is another feature of this invention that the railing can be partially disassembled to facilitate the shipments of boats by the boat manufacturer.

These and other objects, features and advantages are accomplished according to the instant invention by providing a boat railing wherein the stanchions are connected to the rail by a threaded member internally threaded into both the rail and each respective stanchion. An insert adapted for connection to the threaded member can be movably inserted within the rail to provide adjustable movement about the axis of the rail. A combination of the rotative movements of each stanchion on the threaded member and about the axis of the rail enables the bases of the stanchion to be properly fitted to the surface of the boat irrespective of the slope of the surface to which the base is to be attached.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a cross-sectional view of an alternative embodiment of the railing connector in its tightened position corresponding to the view seen in FIG. 3;

FIG. 5 is a cross-sectional view of another alternative embodiment of the railing connector shown in its tightened position corresponding to the view seen in FIG. 3;

FIG. 6 is a cross-sectional view of the railing connector taken along lines 6—6, showing the extent of adjustable movement in phantom;

FIG. 7 is a cross-sectional view taken along lines 7—7 in FIG. 4 through the driver portion of the railing connector; and FIG. 8 is a cross-sectional view taken through the driver portion of the railing connector seen in FIG. 5, taken along lines 8—8.

DETAILED DESCRIPTION OF THE PREFERRED EMBODIMENT

Figure 1:
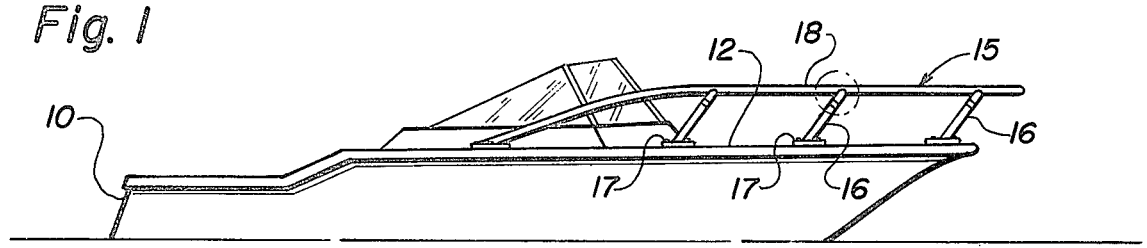
FIG. 1 is a side elevational view of a boat having a railing incorporating the principles of the instant invention affixed thereto.

Referring now to the drawings and, particularly, to FIG. 1, a side elevational view of a boat having a railing incorporating the principles of the instant invention affixed thereto can be seen. The boat 10 is shown in a respresentative form in a side elevational view with a representative railing 15 affixed to the top surface 12 of the boat 10. Although the surface 12 of the boat 10 to which the 15 is connected is shown as being generally horizontal, it should be noted that typically the surface 12 will have a pitch thereto for various reasons, including draining water to the outer edges of the boat 10. The railing 15 is comprised of vertically inclined stanchions 16 connected to a generally horizontal rail 18 at one end and via a base 17 to the top surface 12 of the boat 10 at the other end.

Figure 2:
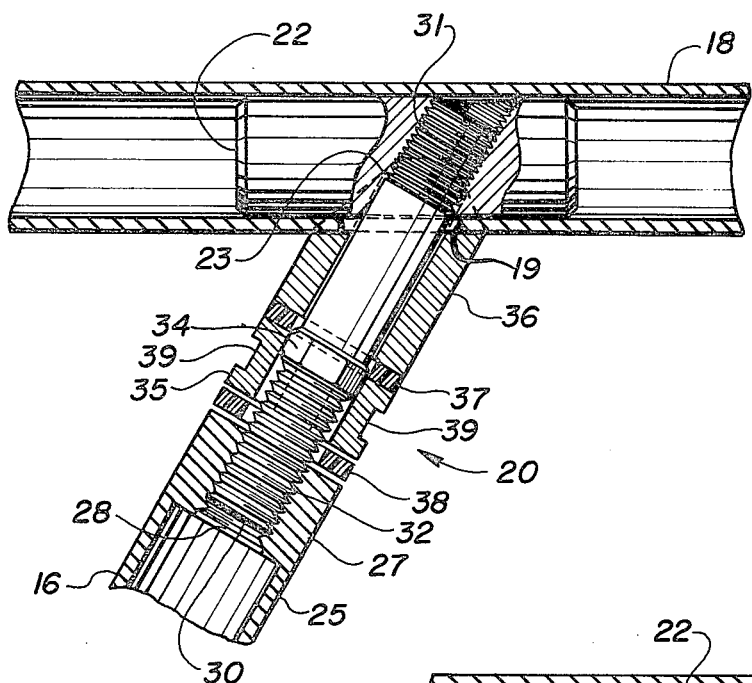
FIG. 2 is an enlarged cross-sectional view of the connector fastening the stanchion to the generally horizontal rail, corresponding to the circled insert seen in FIG. 1, the connector being shown in a loosened state to permit adjustment of the base of the stanchion.
Figure 3:
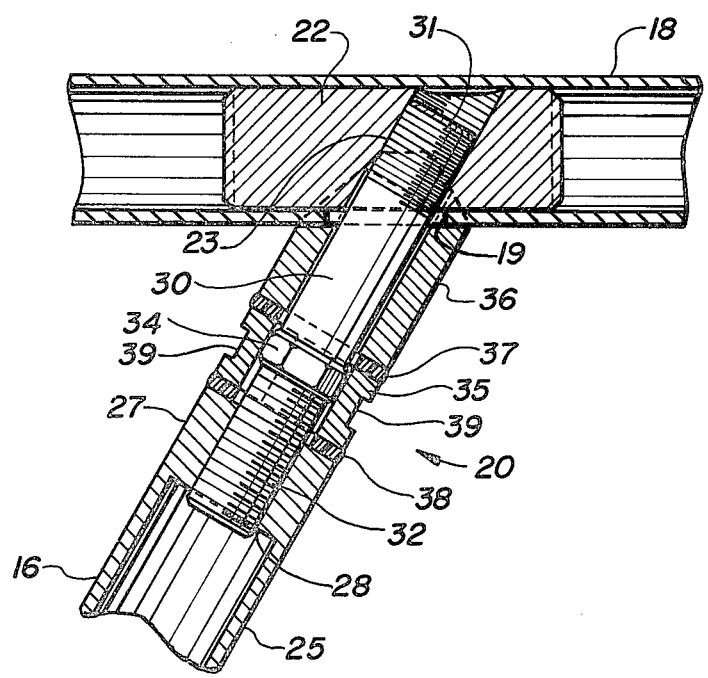
FIG. 3 is an enlarged cross-sectional view corresponding to FIG. 2 with the connector being tightened to fixedly secure the stanchion to the rail.

Referring now to FIGS. 1, 2 and 3, the details of the railing connector 20, connecting each stanchion 16 to the generally horizontal rail 18 can be seen. At the location of connection to each respective stanchion 16, the tubular rail 18 is provided with a movable insert 22. For the purposes of the instant invention, it is only necessary that the insert 22 be rotatably movable about the axis of the rail 18; however, the insert 22 may also be movable along the axis within the rail 18. The insert 22 is provided with a threaded opening 23 positioned therein for alignment with the angled stanchion 16. As will be described in further detail below, the threaded member 25 is engageable with the insert 22 through an oversized opening 19 in the underside of the rail 18, further reference thereto may be had to FIG. 6.

The upper end 25 of each stanchion 16 is provided with a plug 27 formed therein or affixed thereto as by welding to form a solid end piece in the tubular stanchion 16. The plug 27 is provided with a threaded hole 28 into which the railing connector 20 can be engaged. The threaded member 30 interconnects the upper end 25 of the stanchion 16 and the insert 22 positioned within the rail 18. The threaded member 30 includes a first threaded portion threadably engageable with the opening 23 in the rail insert 22 and a second threaded portion threadably engageable with the hole 28 in the plug 27 at the upper end 25 of the stanchion 16. Located between the first and second threaded portions 31,32, as seen in FIG. 7, is a hexagonal drive portion 34. As described below, the railing connector 20 is assembled such that a drive member 35 is engageable with the drive portion 34 to affect rotation of the threaded member 30.

As can be seen in FIGS. 2 and 3, the first and second threaded portions 31,32 have different pitched threads, although they are both threaded in the same direction. A sleeve or spacer 36, coped to fit the rail 18, extends between the drive member 35 and the rail 18 to provide an asthetically smooth and unitary appearance. The railing connector 20 also includes washers 37,38 disposed between the sleeve 36 in the drive member 35 and the drive member 35 and the stanchion 16, respectively. The drive member 35 is provided with flats 39 for cooperation with an external tool, such as a wrench, to effect rotation of the drive member 35, as best seen in FIG. 7.

To assemble a boat railing according to the principles of the instant invention, the first portion 31 of the threaded member 30 is inserted through the opening 19 in the bottom of the rail 18 and threaded into the threaded opening 23 in the rail insert 22 until, preferably, it is entirely received therewithin. After slipping the sleeve 36, washer 37, drive member 35 and washer 38 over the threaded member 30 in their respective positions shown in FIGS. 2 and 3, the stanchion 16 is threaded onto the second portion 32 of the threaded member 30 by engaging the second threaded portion 32 into the threaded hole 28 in the plug 27. By stopping the stanchion 16 within approximately one revolution of being snuggly secured against the washer 38 and drive member 35, adjustment of the position of the base 17 of the stanchion 16 can be accomplished by a combination of rotating the stanchion 16 on the second portion 32 of the threaded member 30 and rotating the stanchion 16 about the axis of the rail 18, within the limits imposed by the oversized hole 19, by rotating the sleeve 36 within the rail 18. After the position of the base 17 has been aligned with the surface 12 of the boat 10 to which it is to be fastened, the base 17 is secured to the boat 10 by fastening means (not shown). Through the use of an external tool, such as a wrench, engaged with the flats 39, the drive member 35 can be rotated, turning the drive portion 34 of the threaded member 30 to draw the rail 18 tightly down against the stanchion 16 until it is secured in place.

Even though both the first and second portions 31,32 of the threaded member 30 have threads extending in the same direction, the difference in thread spacing (pitch) permits the rail 18 to be drawn down against the stanchion. Because the pitch is greater on the second portion 32 than on the first portion 31, the threaded member 30 is drawn into the stanchion 16 faster than it is pulling out of the insert 22, resulting in a net shortening of the distance between the rail 18 and stanchion 16 until it is tight. Furthermore, the differences in the pitch of the threads on the first and second portions 31,32 operatively acts as a locking means through a wedging affect to prevent the railing connector 20 from loosening after being tightly drawn into position. The provision of washers 37,38 having a thickness at least as great as the thread pitch on the second portion 32 prevents the sleeve 36, drive member 35 and stanchion 16 from binding on each other, permitting the rail 18 to tighly drawn down toward the stanchion 16. As noted above, FIG. 2 indicates the preferred relative position of the various components of the railing connector 20 before the railing connector is tightened, while FIG. 3 depicts the relative positions of the components after the rail 18 has been tightly drawn down against the stanchion 16.

Referring to the alternative embodiment seen in FIG. 4, it can be seen that the threaded member 30 can be modified to include the first threaded portion 31, a drive portion 34 and a retaining portion 42 necked down to a diameter smaller than that of the drive portion 34 so as to pass through the hole 44 at the end of the stanchion 16. A head 45 formed as part of the retaining portion 42, or permanently affixed thereto as by welding, prevents the retaining portion 42 from being withdrawn from inside the stanchion 16. A lock washer 47 provides a means for locking the position of the threaded member 30 relative to the stanchion 16 after being tightened, while a small thrust washer 48 facilitates the tightening of the railing connector 20.

Obviously, the threaded member 20 must be preassembled within the end 43 of the stanchion 16 at the location of manufacturing of the railing 15 prior to securing the plug 27 to the stanchion end 45. However, the operation for assembly of the boat railing 15 is substantially the same as that described above relative to FIGS. 2 and 3. The washer 38, drive member 35, washer 37 and sleeve 36 must be slipped over the first portion 31 of the threaded member 30 before engaging the first portion 31 into the threaded opening 23 in the rail insert 22. After adjusting the base 17 for proper alignment with the top surface 12 of the boat 10, and fastening it thereto, the drive member 35 can be rotated with the assistance of a wrench or similar tool engaged with the flats 39 to draw the rail 18 downwardly against the stanchion 16, compressing the lock washer 47 until the railing connector 20 is tightly drawn up.

Referring now to the other alternative embodiment seen in FIGS. 5 and 8, it can be seen that the threaded member 30, with proper modifications, can be constructed from readily available hardware, such as a bolt 50 having the shaft 51 thereof passing through the hole 54 in the end of the stanchion 16 The threaded portion 31 is engaged into the threaded opening 23 of the rail insert 22. Instead of manufacturing the threaded member 30 from hexagonal shaped stock to provide a suitable drive portion 34, a passageway 56 can be drilled into the shaft 51 of the bolt 50 to receive a roll pin 57 positioned to project outwardly from the shaft 51. A keyway 59 cut into the drive member 35 permits the drive member 35 to slide down over the roll pin 57 for engagement therewith to cause rotation of the bolt 50.

Preferably, the bolt 50 is preassembled at the point of manufacture of the rail 15 with the roll pin 57 securely positioned to keep the bolt 50 from dropping down within the tubular stanchion 16. Assembly would be very similar to the embodiment depicted in FIG. 4, with the washer 38, drive member 35, washer 37 and sleeve 36 being slid over the threaded portion 31 of the bolt 50 prior to insertion thereof into the rail insert 22. Rotation of the drive member 35 in cooperation with engagement with the roll pin 57 draws the rail 18 downwardly toward the stanchions 16, compressing the lock washer 47.

One skilled in the art will readily realize the advantages of the instant invention. Since the rail and stanchions do not have to be preassembled and welded into a fixed location prior to shipping, shipping problems and space requirements are greatly reduced. Proper fit between the base 17 of the stanchion 16 can be obtained by adjustment of the stanchion 16 relative to the rail 18 prior to fixing the base 17 to the top surface 12 of the boat 10. It has been found that once tightly drawn into place, the boat railing 15 will support adequate weight and gives an asthetically pleasing appearance. Although it is preferable to construct the instant invention from stainless steel to minimize corrosion problems, since boats are often in contact with salt water, the instant invention is not so limited. It will also be realized that the stanchions can be individually replaced with relative ease, which cannot be accomplished with welded unitary railings.

It will be understood that changes in the details, materials, steps and arrangement of parts which have been described and illustrated to explain the nature of the invention will occur to and may be made by those skilled in the art upon a reading of this disclosure within the principals and scope of the invention. The foregoing description illustrates the preferred embodiment of the invention; however, concepts, based upon the description may be employed in other embodiments without departing from the scope of the invention. Accordingly, the following claims are intended to protect the invention broadly, as well as in the specific form shown.

Having thus described the invention, what is claimed is:

1. A railing connector for connecting a first railing member to a second railing member at an angular relationship thereto, comprising:
a threaded member having a first portion engageable with said first railing member, a second portion engageable with said second railing member and a drive portion positioned between said first and second portions;
an adjustment member received within said first railing member, said adjustment member being axially aligned with said first railing member and rotatable about said first railing member axis to permit a circumferential movement of said second railing member about the axis of said first railing member, said adjustment member having a threaded opening therein to receive said threaded member;
a drive member engaged with said drive portion of said threaded member to affect rotation of said threaded member;
a spacer having an opening therethrough for the passage of said first portion of said threaded member, said spacer being positioned between said drive member and said first railing member; and
washers positioned, respectively, between said drive member, said spacer and said second railing member, each said washer having a thickness at least as great as the largest thread spacing of said threaded member.

2. The railing connector of claim 1 wherein both said first and second portions are threaded, said second railing member being adapted to threadably receive said second portion of said threaded member.

3. The railing connector of claim 2 wherein said first and second portions have different pitched threads extending in the same direction.

4. The railing connector of claim 3 wherein said drive portion of said threaded member has a non-circular cross section engageable with said drive member so that there is no relative rotational movement therebetween, said drive member being adapted for connection to a tool for effecting rotation thereof.

5. The railing connector of claim 4 wherein said second railing member, said drive member, said washers and said spacer form a smooth integral railing structure with said first railing member when said railing connector is drawn tightly.

6. A method of fixing a railing to a boat having a variably sloped surface upon which said railing is to be fixed, comprising the steps of:
(a) connecting a stanchion having a base thereon to a rail by a threaded member internally threaded into said stanchion and into a sleeve movably positioned within said rail;

(b) rotating said stanchion on said threaded member and turning said stanchion about the axis of said rail by moving said sleeve relative to said rail until said base is aligned with the surface of said boat immediately adjacent thereto;

(c) fastening said base to said boat to fixedly connect said stanchion thereto;

(d) turning said threaded member to tighten said stanchion onto said rail; and (e) repeating said connecting, rotating, fastening and turning steps for each stanchion connecting said rail to said boat.

7. The method of claim 6 further comprising the step of:

locking said threaded member to prevent movement thereof relative to said stanchion and said rail.

8. The method of claim 7 wherein said locking step includes inserting a lock washer between said threaded member and said stanchion before said connecting step.

9. The method of claim 7 wherein said connecting step includes:

screwing a first end of said threaded member having threads spaced apart a first pitch into said sleeve; and threading said stanchion onto said second end of said threaded member having threads spaced apart a second pitch.

10. The method of claim 9 wherein said locking step includes:

providing said second end of said threaded member with threads spaced apart a greater distance than the threads on said first end such that said stanchion is jammed into a position relative to said rail.

11. The method of claim 10 wherein said threaded member is tightly screwed into said sleeve before threading said stanchion onto said threaded member.

12. The method of claim 11 wherein said stanchion is threaded onto said threaded member within approximately one revolution of being tightly threaded thereon.

13. The method of claim 12 wherein said turning step tightens said stanchion onto said threaded member more rapidly than said threaded member is loosened from said sleeve.

14. A railing connector for connecting a first railing member to a second railing member at an angular relationship thereto, comprising:

a threaded member having a threaded first portion engageable with said first railing member, a second portion including a head engageable with said second railing member and a drive portion positioned between said first and second portions, said drive portion having a pin radially extending therefrom, said second railing member having an aperature therein smaller than said head to receive said threaded member and to retain said head within said second railing member, yet permitting rotation of said threaded member therewithin;

an adjustment member received within said first railing member, said adjustment member being axially aligned with said first railing member and rotatable about said first railing member axis to permit a circumferential movement of said second railing member about the axis of said first railing member, said adjustment member having a threaded opening therein to receive said threaded member;

a lock washer engaged with said threaded member to prevent said threaded member from disengaging said adjustment member after said first railing member has been tightly connected to said second railing member, said lock washer being positioned between said head and said second railing member; and a drive member engaged with said drive portion of said threaded member to affect rotation of said threaded member, said drive member having a key way formed therein for engagement with said pin to affect rotation of said threaded member when said drive member is rotated, said drive member being externally adapted for connection with a tool for affecting rotation thereof.

15. The railing connector of claim 14 further comprising a spacer having an opening therethrough for the passage of said first portion of said threaded member, said spacer being positioned between said drive member and said first railing member.

16. The railing connector of claim 15 wherein washers are positioned, respectively, between said drive member, said spacer and second railing member, each said washer having a thickness at least as great as the thread spacing of said threaded member.

* * * * *